United States Patent [19]
Itoi

[11] Patent Number: 5,938,789
[45] Date of Patent: Aug. 17, 1999

[54] PLAYBACK DATA DETECTING APPARATUS

[75] Inventor: Satoshi Itoi, Tokyo, Japan

[73] Assignee: NEC Corporation, Japan

[21] Appl. No.: 08/757,213

[22] Filed: Nov. 27, 1996

[30] Foreign Application Priority Data

Nov. 29, 1995 [JP] Japan ................................ 8-310857

[51] Int. Cl.⁶ ...................... G11B 20/18; G11B 20/22
[52] U.S. Cl. ........................ 714/795; 360/39; 360/40; 375/233
[58] Field of Search ............................ 369/59; 360/39, 360/40, 48; 371/43.1, 43.7; 375/229, 230, 231, 232, 233, 341

[56] References Cited

U.S. PATENT DOCUMENTS

| | | | |
|---|---|---|---|
| 4,580,275 | 4/1986 | Pirani et al. | 375/16 |
| 5,353,307 | 10/1994 | Lester et al. | 375/14 |
| 5,432,821 | 7/1995 | Polydoros et al. | 375/340 |
| 5,539,774 | 7/1996 | Nobakht et al. | 375/232 |
| 5,668,833 | 9/1997 | Kurokami et al. | 375/233 |

FOREIGN PATENT DOCUMENTS

| | | |
|---|---|---|
| 3-62753 | 3/1991 | Japan . |
| 4-298865 | 10/1992 | Japan . |
| 4-307817 | 10/1992 | Japan . |
| 6-76422 | 3/1994 | Japan . |
| 6-124542 | 5/1994 | Japan . |
| 6-124549 | 5/1994 | Japan . |

OTHER PUBLICATIONS

"Digital Signal Processing", Institute of Electronics, Information and Communication Engineers, pp. 240–245.

Hirsch et al., "A Simple Adaptive Equalizer for Efficient Data Transmission", IEEE Transactions on Communication Technology, vol. COM–18, No. 1, Feb. 1970, pp. 5–11.

Tyner et al., "Partial Response Equalizer Performance in Digital Magnetic Recording Channels", IEEE Transactions on Magnetics, vol. 29, No. 6, Nov. 1993, pp. 4194–4208.

*Primary Examiner*—Stephen M. Baker
*Attorney, Agent, or Firm*—Ostrolenk, Faber, Gerb & Soffen, LLP

[57] ABSTRACT

A playback data detecting apparatus comprises a transversal filter 11 for performing partial response equalization, a Viterbi decoding circuit 12 for subjecting the output of the transversal filter 11 to Viterbi decoding, a selected code determination circuit 13 for selecting either (the) (delayed) data of the output of the transversal filter 11 or the output of the Viterbi decoding circuit 12 to determine (the an output corresponding equalization function), a reducing code determination circuit 14 for determining (an output code) by subtracting by the output of the Viterbi decoding circuit 12 (from) (the delayed) data of the output of the transversal filter 11, a (clocked) delaying circuit 15 for delaying the output of the selected code determination circuit 13 and the output of the reducing code determination circuit 14, respectively, and a multiplying coefficient calculating circuit 16 which calculates the optimal multiplying coefficients of the transversal filter 11 for minimizing bit errors from the output of the (clocked) delaying circuit 15 and outputs the calculated result to the transversal filter 11. As a result, it is possible to reduce the bit error rate of playback signal recorded in digital disk recorders, disk VTRs etc. to playback and detect optimal data.

6 Claims, 8 Drawing Sheets

FIG. 8

| TERNARY/ BINARY | VITERBI/ BIT | STATE/LEVEL | D0 | D1 | D2 |
|---|---|---|---|---|---|
| TERNARY | VITERBI | S2 | 1 | 0 | 1 |
| | | S0 | 0 | 1 | 1 |
| | | S1, S3 | 1 | 1 | 0 |
| BINARY | VITERBI | S1, S2 | 1 | 0 | 1 |
| | | S0, S3 | 0 | 1 | 1 |
| TERNARY | BIT | 0.5<y (01XXXX) | 1 | 0 | 1 |
| | | y<0.5 (10XXXX) | 0 | 1 | 1 |
| | | −0.5≤ y ≤0.5 (00 ,11 ) | 1 | 1 | 0 |
| BINARY (C.F.) | BIT | 0≤y (0XXXXX) | 1 | 0 | 1 |
| | | y<0 (1XXXXX) | 0 | 1 | 1 |

FIG. 9

| DATA BIT | CHANNEL BIT |
|---|---|
| 1 ( 0 ) | 1 0 ( 0 0) |
| 0 ( 0 1 0) | 0 0 ( 0 0 1 0 0 0) |
| 0 1 ( 0 ) | 0 0 1 0 ( 0 0) |
| 0 0 ( 0 ) | 1 0 0 1 ( 0 0) |
| 0 0 1 ( 0 ) | 0 0 0 0 1 0 ( 0 0) |

FIG. 10

| DATA BIT | CHANNEL BIT |
|---|---|
| 0 0 | 0 0 X |
| 0 1 | 0 1 0 |
| 1 0 | 1 0 X |
| 1 1 0 0 | 0 0 0 0 1 0 |
| 1 1 0 1 | 0 0 0 0 0 X |
| 1 1 1 0 | 1 0 0 0 1 0 |
| 1 1 1 1 | 1 0 0 0 0 X |

NRZI RECORDING
X: WHEN NEXT CHANNEL BIT IS "0" X=1

WHEN NEXT CHANNEL BIT IS "1" X="0"

FIG. 11

| DATA BIT | CHANNEL BIT |
|---|---|
| 1 1 | 0 1 0 0 |
| 1 0 | 1 0 0 0 |
| 0 1 1 | 0 0 0 1 0 0 |
| 0 1 0 | 0 0 1 0 0 0 |
| 0 0 0 | 1 0 0 1 0 0 |
| 0 0 1 1 | 0 0 1 0 0 1 0 0 |
| 0 0 1 0 | 0 0 0 0 1 0 0 0 |

NRZI RECORDING

PLAYBACK DATA DETECTING APPARATUS

BACKGROUND OF THE INVENTION

1. Field of the Invention

The present invention relates to a playback data detecting apparatus such as a digital disk storage device (an optical disk storage device, a magneto-optical disk storage device, a phase-change disk storage device, a hard disk device, etc.), a digital VCR and the like.

2. Description of the Prior Art

Conventionally, digital-recording disk devices, digital-recording VTRs and the like have recorded data by converting the data into recording codes without recording the data as it is. As representative recording codes, there are a 1–7 code and a 2–7 code.

FIG. 10 shows a code conversion table of the 1–7 code. In FIG. 10, 2 data bits or 4 data bits are recorded after being converted into 3 channel bits or 6 channel bits, respectively, according to an NRZI rule. The NRZI rule is a rule to invert a data bit and record the same when it is "1" while to record a data bit as it is when it is "0". A remarkable feature of the 1–7 code is that there are one to seven "0"s between "1" and "1" after conversion according to the table in FIG. 10.

FIG. 11 shows a code conversion table of the 2–7 code. In FIG. 11, 2 data bits, 3 data bits or 4 data bits are recorded after being converted into 4 channel bits, 6 channel bits or 8 channel bits respectively according to the NRZI rule. A remarkable feature of the 2–7 code is that there are two to seven "0"s between "1" and "1" after conversion according to the table in FIG. 11.

Further, both codes comprise synchronizing signals inserted therein every several hundred or thousand bits for recovering from a decoding pattern shift which likely occurs due to an error at the time of recording or playback. The synchronizing signals employ channel bit patterns which do not appear in ordinary data to be clearly distinguished therefrom.

Whereas recently, there is proposed a method of correcting bit errors for a recording code having limited continuous bit length patterns such as the 1–7 and the 2–7 code by way of Viterbi decoding. For example, a method of performing the Viterbi decoding by subjecting a recorded code having a minimum non-inverted interval of 2-channel bits such as the 1–7 code to ternary detection and a method of performing the Viterbi decoding by subjecting a recorded code having a minimum non-inverted interval of 2-channel bits such as the 1–7 code to binary detection are described in the Japanese Unexamined Patent Publication Nos. 4-307817(1992) and 4-298865(1992), respectively, both being entitled "Playback data detecting method", and a method of performing the Viterbi decoding by subjecting the recorded code having the minimum non-inverted interval of 3-channel bits to the ternary detection and a method of performing the Viterbi decoding by subjecting the recorded code having a minimum non-inverted interval of 3-channel bits to the binary detection are described in the Japanese Unexamined Patent Publication Nos. 4-307817(1992) and 6-124549(194), respectively, both being entitled "Playback data detecting method". The detailed description thereof is omitted here.

Moreover, optimal equalization by way of automatic adaptation is described in "Digital Signal Processing", edited by the Institute of Electronics, Information and communication Engineers, pp. 240–245.

Multiplying coefficients am1 to am5 can be expressed in the following equations, wherein subscripts t to 2-t indicate time, "sign" indicates a function, $\Sigma$ indicates an integrated value, "dx" indicates a predetermined delay value of an input data after binary determination, "dy" indicates a predetermined delay value of an output data after binary determination and "$\epsilon$" indicates a value obtained by subtracting "dy" from the predetermined delay analog value of an output data.

[Equation 1]
 MZF method $$am1_{t+1} = am1_t - \text{sign}(\Sigma \epsilon_{t-2} \cdot dx_t)$$

$$am2_{t+1} = am2_t - \text{sign}(\Sigma \epsilon_{t-1} \cdot dx_t)$$

$$am3_{t+1} = am3_t - \text{sign}(\Sigma \epsilon \cdot dx_t) \quad (1)$$

$$am4_{t+1} = am4_t - \text{sign}(\Sigma \epsilon_t \cdot dx_{t-1})$$

$$am5_{t+1} = am5_t - \text{sign}(\Sigma \epsilon_t \cdot dx_{t-2})$$

[Equation 2]
 ZF method $$am1_{t+1} = am1_t - \text{sign}(\Sigma \epsilon_{t-2} \cdot dy_t)$$

$$am2_{t+1} = am2_t - \text{sign}(\Sigma \epsilon_{t-1} \cdot dy_t)$$

$$am3_{t+1} = am3_t - \text{sign}(\Sigma \epsilon_t \cdot dy_t) \quad (2)$$

$$am4_{t+1} = am4_t - \text{sign}(\Sigma \epsilon_t \cdot dy_{t-1})$$

$$am5_{t+1} = am5_t - \text{sign}(\Sigma \epsilon_t \cdot dy_{t-2})$$

Although a playback system which performs partial response equalization by way of automatic adaptation in digital disk recorders and digital VTRs which record data by way of recording codes having limited continuous bit length patterns such as the 1–7 code and 2–7 code to obtain data with high reliability after playback, and which further subjects the outputs thereof to bit error correction by way of ternary/binary Viterbi decoding of, 4-state/6-state Viterbi decoding, etc. can obtain data with low bit error rate and high reliability to some extent, the automatic adaptive equalizer and the Viterbi decoder operate independently from each other and are connected to each other in series, so that it cannot be said that such a playback system is optimal from an overall point of view. Accordingly, it is an object of the present invention to reduce the bit error rate of recorded or playback codes so as to detect an optimal playback data by integrally operating the automatic adaptive equalization and Viterbi decoding.

SUMMARY OF THE INVENTION

In order to attain the object set forth above, a playback data detecting apparatus according to the present invention comprises a transversal filter for subjecting data recorded for playback using recording codes having a minimum non-inverted interval of 2, 3 or other than those to partial response equalization, a Viterbi decoding circuit for subjecting the output of the transversal filter to Viterbi decoding, a selected code determination circuit for selecting either delayed data of the output of the transversal filter or the output of the Viterbi decoding circuit to determine a corresponding equalization function, a reducing code determination circuit for determining code by an output calculating the difference between the delay data of the output of the transversal filter and the output of the Viterbi decoding circuit, a clocked delaying circuit for delaying the output of the selected code determination circuit and the output of the reducing code determination circuit, respectively, and a multiplying coefficient calculating circuit which calculates the optimal multiplying coefficients of the transversal filter for minimizing bit errors from the output of the clocked delaying circuit and outputs the calculated result to the transversal filter, thereby operating the automatic adaptation in combination with Viterbi decoding to enable the reduction of bit errors and the detection of optimal playback data.

BRIEF DESCRIPTION OF THE DRAWINGS

This above-mentioned and other objects, features and advantages of this invention will become more apparent by reference to the following detailed description of the invention taken in conjunction with the accompanying drawings wherein:

FIG. 8 is a conversion table of D0 to D2 in each decoding system according to the embodiment of the present invention;

FIG. 9 is a conversion table at a junction between data and a synchronizing signal;

FIG. 10 is a conversion table for the 1–7 code; and

FIG. 11 is a conversion table of the 2–7 code.

DETAILED DESCRIPTION OF THE PREFERRED EMBODIMENTS

An embodiment of the present invention will be now described with reference to drawings.

Figure 1:
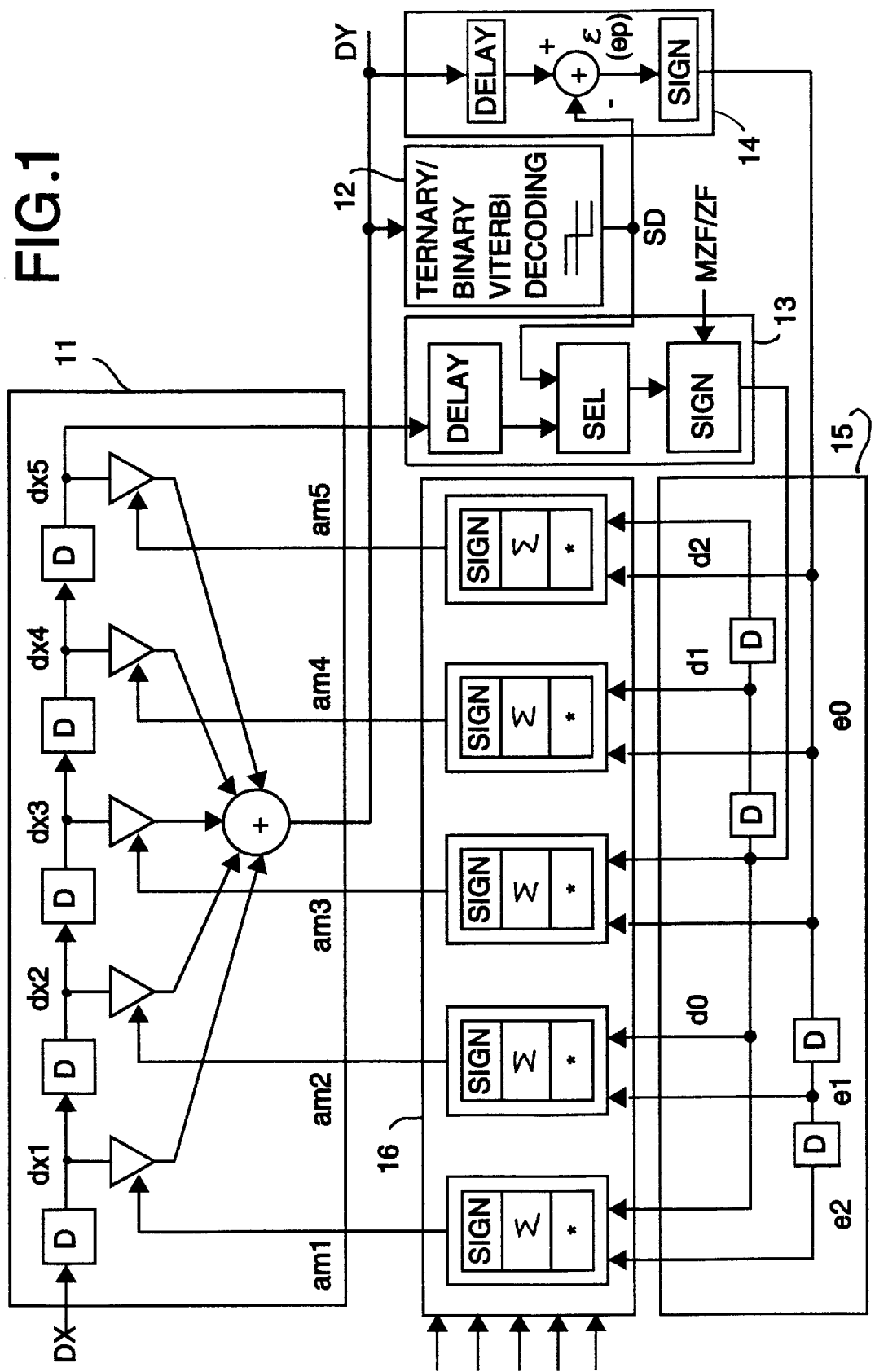
FIG. 1 is a block diagram showing a configuration of a playback data detecting apparatus according to an embodiment of the present invention.

FIG. 1 is a block diagram showing a configuration of a playback data detecting apparatus according to an embodiment of the present invention.

Denoted at 11 is a transversal filter in which DX is an input and DY is an output and which comprises five taps respectively having multiplying coefficients am1, am2, am3, am4 and am5 to realize a partial response characteristic (1, 1) in this embodiment.

Denoted at 12 is a Viterbi decoding circuit in which DY is an input and sd is an output. In contrast, conventional adaptive automatic equalization circuits employ here a method of determining every binary bit, i.e., whether it is in high level or in low level. The present invention employs ternary/4-state or binary/4-state Viterbi decoding for a recording code having a minimum non-inverted interval of 2 bits, ternary/6-state or binary/6-state Viterbi decoding for a recording code having a minimum non-inverted interval of 3 and a Viterbi decoding of ternary, binary or higher levels for recording codes of other non-inverted intervals.

Further, there may be employed a method of ternary or higher decoding for every bit.

Denoted at 13 is a selected code determining circuit, which delays the input of the transversal filter 11 to conform the same in phase to the output of the Viterbi decoding circuit, selects the delayed data when the MZF equalization is selected and selects the output sd of the Viterbi decoding circuit 12 when the ZF equalization is selected, thereby determining the function code used to calculate output d0.

Denoted at 14 is a reducing code determining circuit, which delays the output of the transversal filter 11 to conform the same in phase to the output of the Viterbi decoding circuit and subtracts the output sd of the Viterbi decoding circuit 12 therefrom, thereby determining the method to calculate output e0.

Denoted at 15 is a clocked delaying circuit, which delays each of the output of the selected code determining circuit and that of the reducing code determining circuit by 1 clock period, respectively.

Denoted at 16 is a multiplying coefficient calculating circuit, which calculates the optimal multiplying coefficients am1, am2, am3, am4 and am5 of the transversal filter and outputs the calculated results to realize the partial response (1, 1) equalization from the outputs d0, d1, d2, e0, e1 and e2 of the clocked delaying circuit and minimize bit errors.

Figure 2:
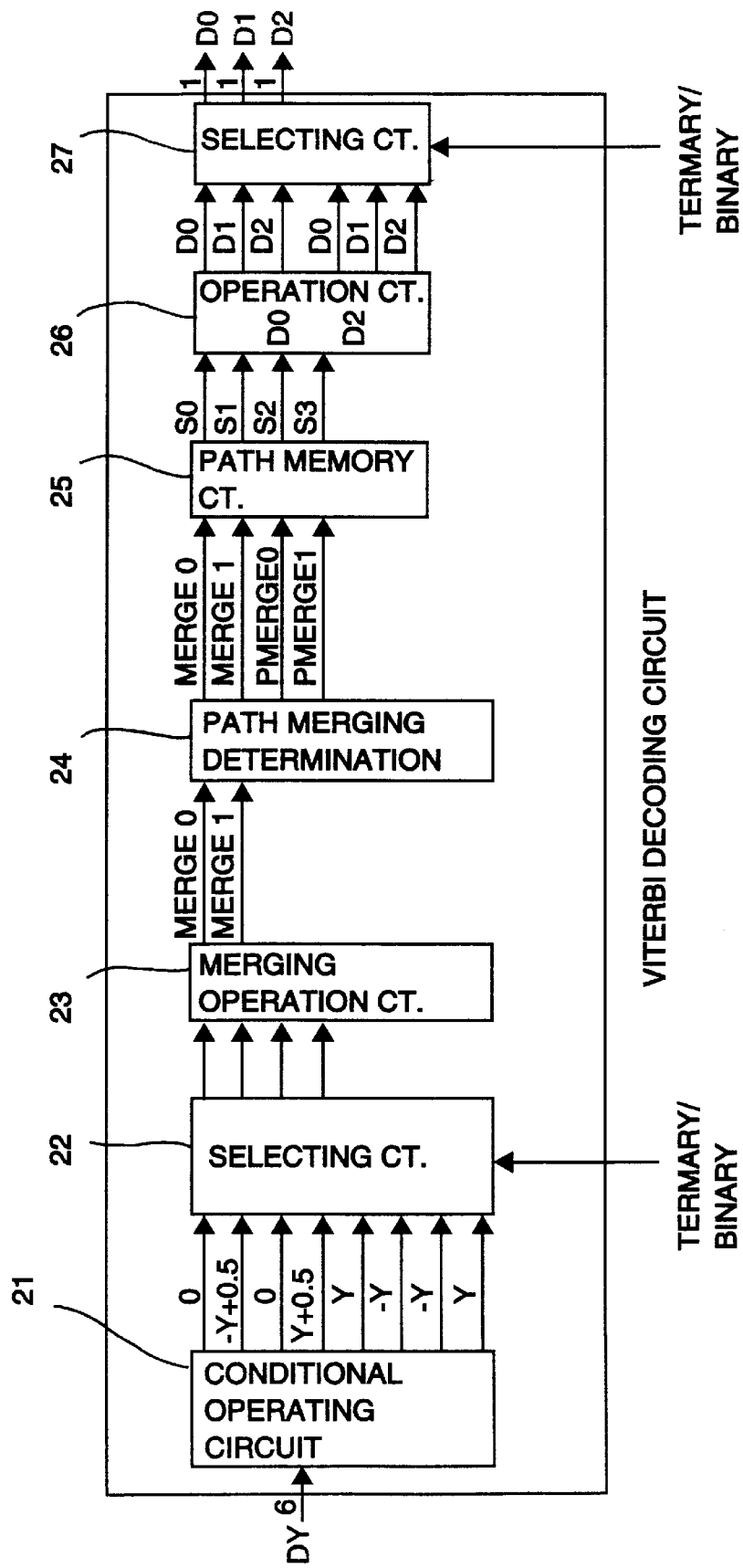
FIG. 2 is a block diagram exemplifying a configuration of a Viterbi decoding circuit according to the present invention.

FIG. 2 shows an example of a Viterbi decoding circuit. The input DY passes through a conditional arithmetic circuit 21, a ternary/binary selecting circuit 22, a merging operation circuit 23, a pass-merging determining circuit 24, a pass memory circuit 25, a D0 to D2 calculating circuit 26, a ternary/binary selecting circuit 27 so as to be outputted as D0, D1 and D2. D0 to D2 will be described later, but the detailed description of the Viterbi decoding circuit operation from the conditional operating circuit 21 to the pass memory circuit 25 will be omitted here since they are described in the documents referred to as the prior art.

Figure 3:
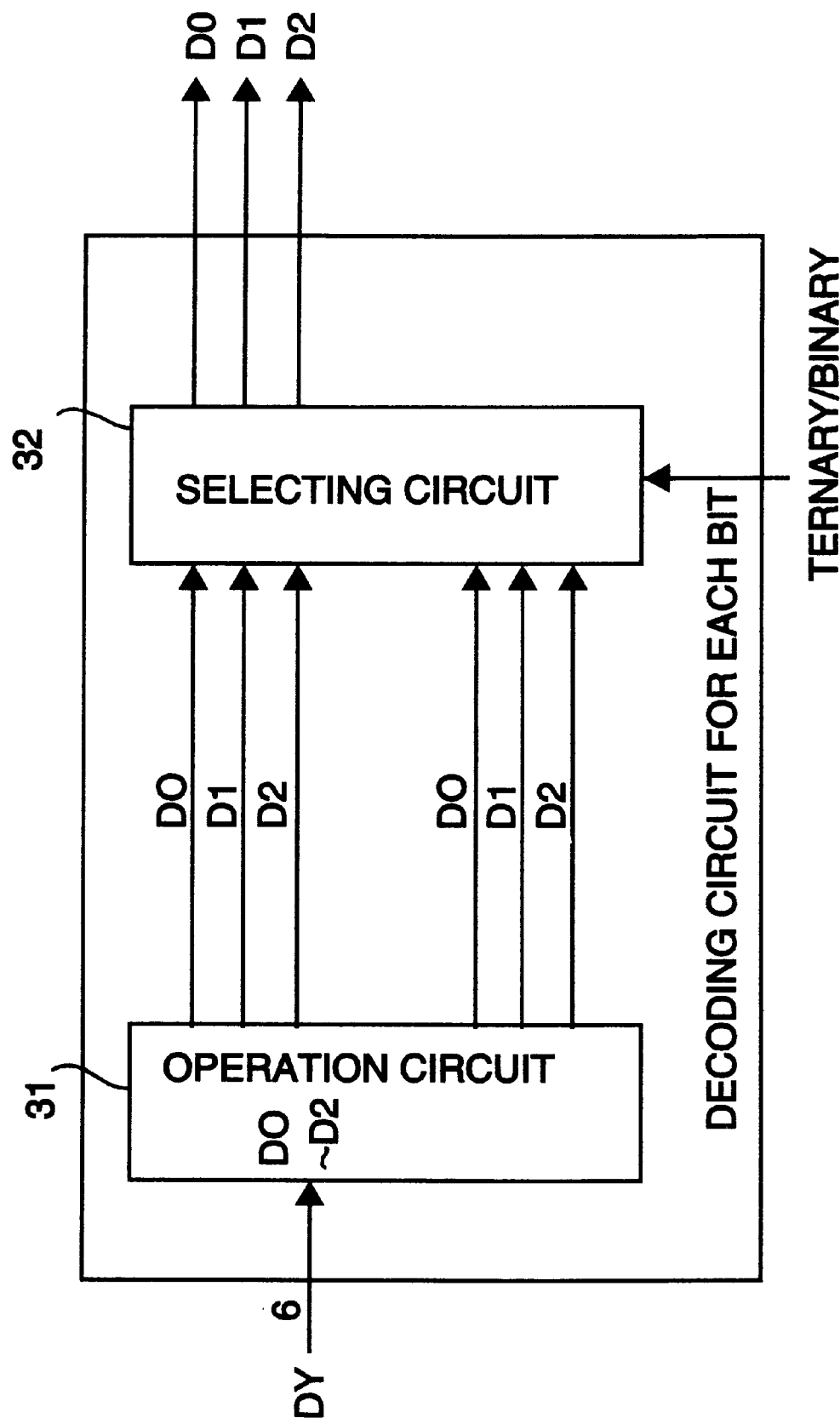
FIG. 3 exemplifies a configuration of a decoding circuit for each bit.

FIG. 3 shows an example of a decoding circuit for each bit. The inputted DY passes through the D0 to D2 calculating circuit 31 and the ternary/binary selecting circuit to be outputted as D0, D1 and D2.

FIG. 8 shows D0, D1 and D2 which are common to FIGS. 2 and 3.

D0, which corresponds to the state level, is a sign bit, and D1 is the other bit, both being inverted. Supposing that S2 and S0 are "−1" and "+1" respectively and S1 and S3 are both "0" in playback such as in the ternary/4-state Viterbi decoding described in the Japanese Unexamined Patent Publication No. 4-307817, S2 becomes D0=0 and D1=1 as the inverted codes of "100000", S0 becomes D0=1 and D1=0 as the inverted codes of "011111", S1 and S3 become D0=1 and D1=1 as the inverted codes of "000000". Further, supposing that as in the case of the ternary/6-state Viterbi decoding described in the Japanese Unexamined Patent Publication No. 4-307817, S2 and S3 are "−1", S6 and S0 are "+1" and S1 and S4 are "0", then S2 and S3 become D0=0 and D1=1 as the inverted codes of "100000", S5 and S0 become D0=1 and D1=0 as the inverted codes of "011111" and S1 and S4 become D0=1 and D1=1 as the inverted codes of "000000".

Supposing that as in the case of the binary/4-state Viterbi decoding described in the Japanese Unexamined Patent Publication No. 4-298865, S2 is "−1" and S3 and S0 are "+1", then S1 and S2 become D0=1 and D1=0 as the inverted codes of "100000". Further, as in the case of the binary/6-state Viterbi decoding described in the Japanese Unexamined Patent Publication No. 6-124549, S1, S2 and S3 are "+1" and S4, S5 and S0 are "+1", the states being inverse to those described above, then S1, S2 and S3 are D0=1 and D1=0 as the inverted codes of "011111" and S4, S5 and S0 are D0=0 and D1=1 as the inverted codes of "100000".

As to decoding for ternary bits, when the input signal is not less than 0.5, the output becomes D0=1 and D1=0 as the inverted codes of "011111", when the input signal is not more than −0.5, the output becomes D0=1 and D1=1 as the inverted codes of "100000" and when the input signal is less than 0.5 and more than −0.5, the output becomes D0=1 and D1=1 as the inverted codes of "000000".

D2 is a calculation prohibiting signal for prohibiting calculation due to a low input level when the input to ternary Viterbi decoding is "0".

As to S1 and S3 in the ternary Viterbi decoding, in decoding of every ternary bit, the output is D2=0 when the input is not more than 0.5 and not less than −0.5, and otherwise D2=1.

Figure 4:
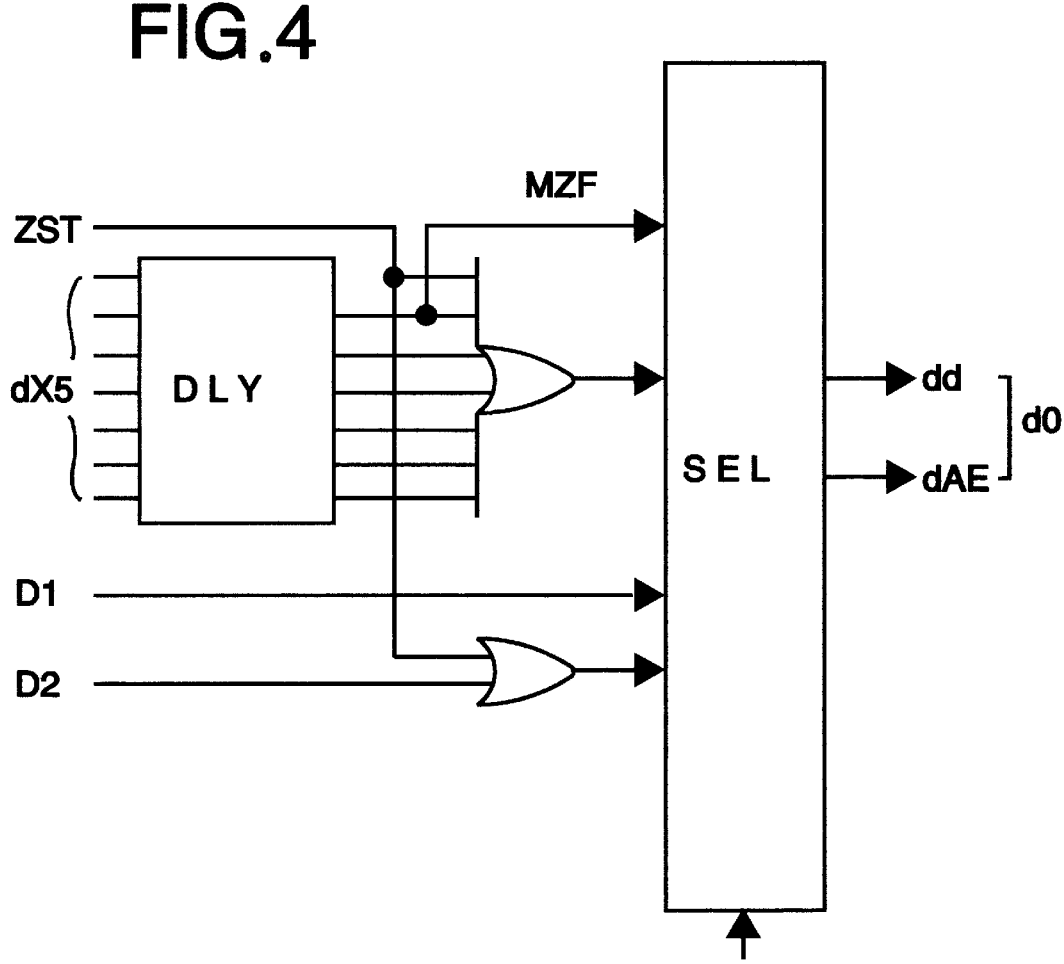
FIG. 4 is a view exemplifying a selected code determination circuit.

FIG. 4 shows a selected signal determining circuit.

At the time of selecting the MZF equalization, the dx5 of the transversal filter 11 is delayed as shown in equation (1) above. When the dx5 conforms in phase to the output sd of the Viterbi decoding circuit 12, an MSB bit, i.e., a sign bit is transferred as a coefficient varying direction signal dd0. When a coefficient varying prohibition flag ZST=0 and all the data bits are "0" at null input, a coefficient varying prohibition flag dAE=0 is transferred to prohibit varying the coefficient. Alternatively, when ZST=1 or all bits are not "0", a coefficient varying prohibition flag dAE=1 is transferred to permit varying the coefficient.

Further, at the time of selecting the ZF equalization as shown in equation (2) above, D1, which corresponds to the sign bit of the output sd of the Viterbi decoding circuit 12, is transferred as the coefficient varying direction signal dd. When the coefficient varying prohibition flag ZST=0 and in cases of S1 and S3 in the ternary Viterbi decoding at null input, or ZST=0 and the input is not more than 0.5 and not less than −0.5 in each ternary bit decoding, a coefficient varying prohibition flag dAE=0 is transferred to prohibit varying the coefficient, alternatively when ZST=1 or all the bits are not "0", a coefficient varying prohibition flag dAE=1 is transferred to permit varying the coefficient.

Figure 5:
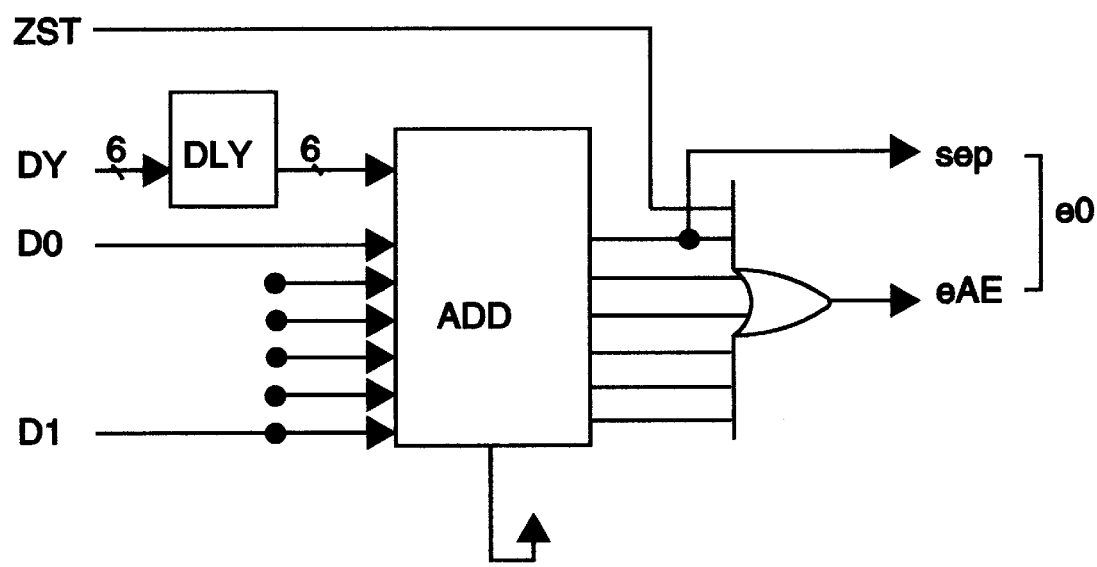
FIG. 5 is a view exemplifying a reducing code determination circuit.

FIG. 5 shows a reducing code determining circuit.

The output DY of the transversal filter 11 is delayed to be conformed in phase to the output of the Viterbi decoding, and the output sd of the Viterbi decoding circuit 12 is subtracted therefrom. Here, since D0 and D1 in the output sd represent in number the state data of the Viterbi decoding, the state data being divided into the MSB bit and the other bit and then respectively inverted to D0 and D1, the same result as that obtained by calculating (DY−sd) by supposing that the MSB bit is D0 and the other bit is D1, adding DY thereto and further adding 1 thereto. The sign bit of the result of subtraction is transferred as sep.

When the coefficient varying prohibition flag ZST=0 and the result of calculation is "0" in all bits at null input, the coefficient varying prohibition flag eAE=0 is transferred to prohibit varying the coefficient, while when ZST=1 or all bits are not "0", the coefficient varying prohibition flag eAE=1 is transferred to permit varying the coefficient.

That is, at the time of selecting the MZF equalization as shown in equation (1), when the sign bit of the dx5 which conforms in phase to sd is different from the sign bit of {(DY−sd) conforming in phase to sd}, the circuit is controlled in a direction for increasing am1 to am5, while in a direction for decreasing the same when they are equal to each other.

At the time of selecting the ZF equalization as shown in equation (2), when the sign bit of sd is different from that of {(DY−sd) conforming in phase to sd}, the circuit is controlled in a direction for increasing am1 to am5, while in a direction for decreasing the same when they are equal to each other.

Figure 6:
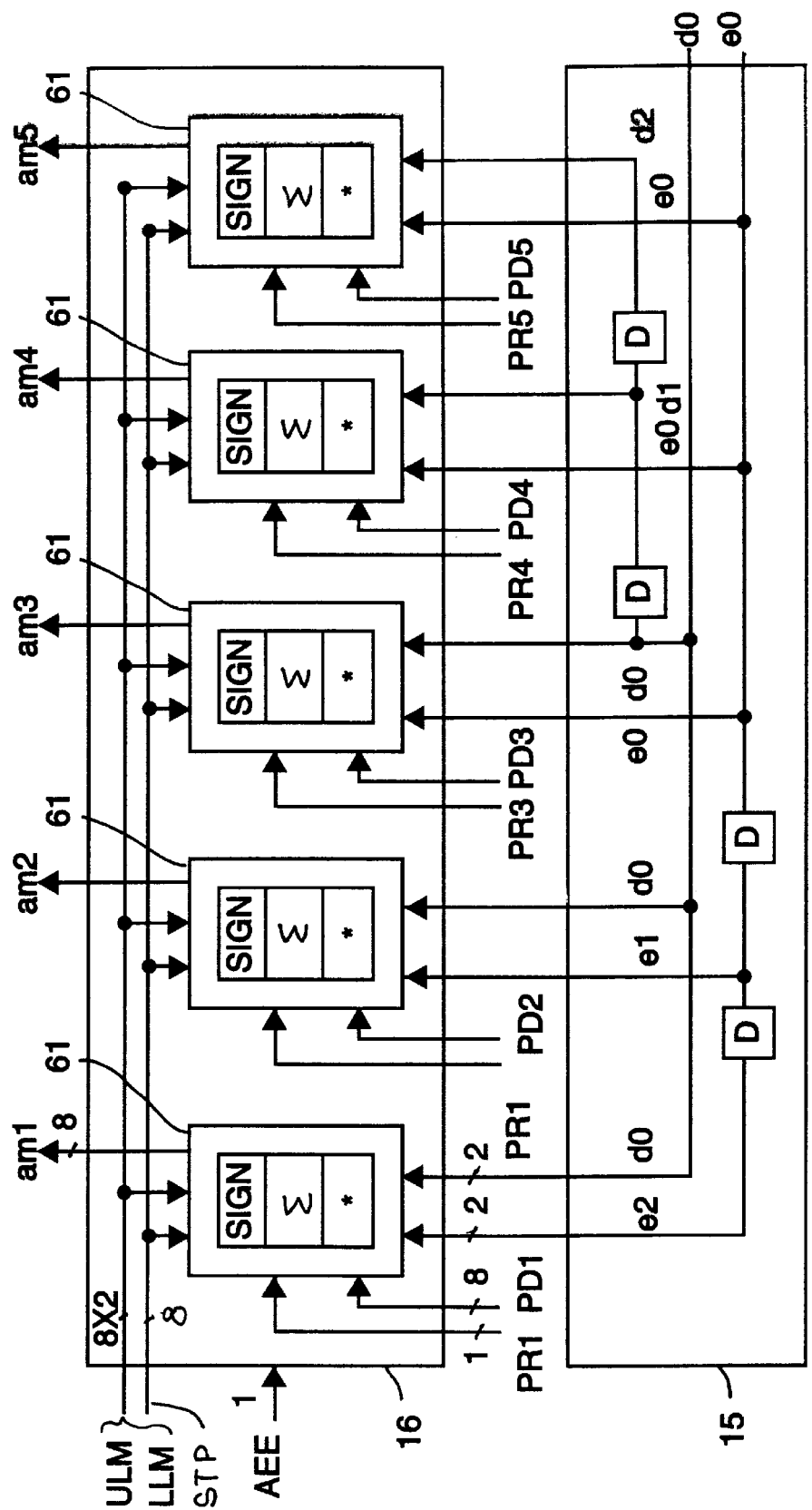
FIG. 6 is a view exemplifying a clocked delaying circuit and a multiplying coefficient calculating circuit.

FIG. 6 shows a clock delay circuit and a multiplying coefficient calculating circuit together.

ULM is an allowable maximum coefficient value, LLM is an allowable minimum coefficient value, STP is a count number of control signals for varying the coefficient by one step, AEE is a coefficient variation permitting (0)/prohibiting (1) control signal, PR1 to PR5 are pre-set control signals of am1 to am5 (0 means pre-set) respectively, PD1 to PD5 are the pre-set values of am1 to am5 respectively, d0 to d2 are the outputs of the selected code determining circuit (dd, dAE), e0 to e2 are the outputs of the reducing code determining circuit (sep, eAE) and am1 to am5 are the outputs of coefficients. The am1 to am5 are respectively controlled by mod 2 addition of d0 and e2, by mod 2 addition of d0 and e1, by mod 2 addition of d0 and e0, by mod 2 addition of d1 and e0, and by mod 2 addition of d2 and e0. Reference numerals 61 show each control circuit.

Figure 7:
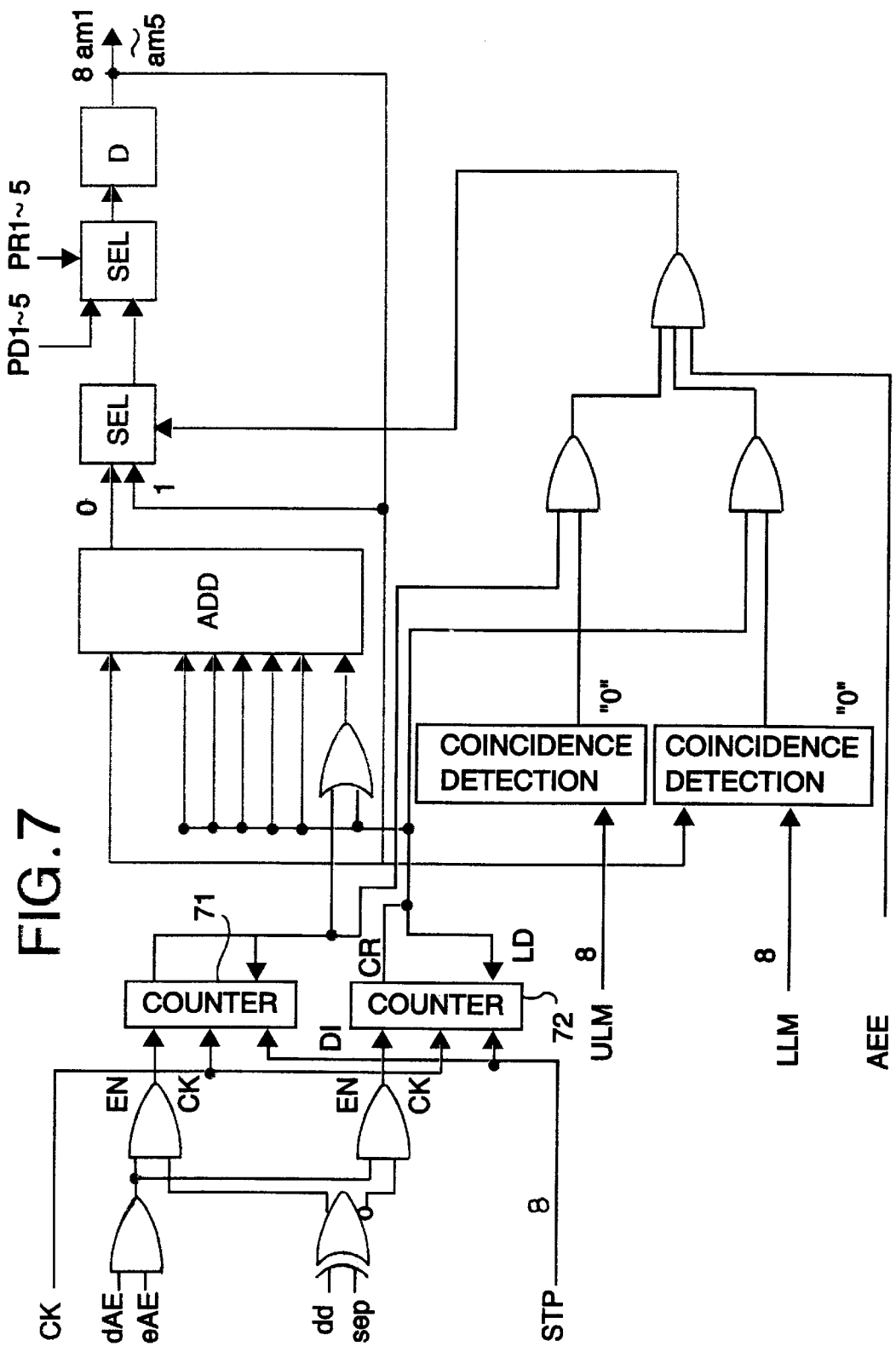
FIG. 7 is a view exemplifying a multiplying and integrating code determination circuit.

FIG. 7 shows each control circuit 61.

When both of the coefficient varying prohibition flags dAE and eAE are "1", counters 71 and 72 start counting, of which the incrementing counter 71 and the decrementing counter 72 count up under conditions dd±sep and dd=sep respectively. If the incrementing counter 71 produces a carrier, the counter adds "1" to a constant and returns to the STP value only when the coefficient is less than ULM and AEE="0", and if the decrementing counter 72 produces a carrier, the counter reduces "1" from a constant and returns to the STP value only when the coefficient is more than LLM and AAE="0". Further, when pre-set control signals PR1 to PR5 are inputted, pre-set data PD1 to PD5 are outputted to am1 to am5 respectively. In this way, it is possible to control the coefficients am1 to am5 of the transversal filter.

The coefficients of the transversal filter will be now described. For bisymmetrical equalization such as partial response (1, 1) or partial response (1, 2, 2, 1), an even number of taps (2n taps) are provided. For example, let us assume n=6, that is, a 6-tap transversal filter comprising am1, am2, am3, am4, am5 and am6, the filter being controlled with common coefficient values at the 1st and 6th, at the 2nd and 5th and at the 3rd and 4th taps, respectively. That is, the coefficients are assigned to three circuits, i.e., 1st, 2nd and 3rd control circuits for controlling am1 (=am6) by the am1 control circuit, am2 (=am5) by the am2 control circuit and am3 (=am4) by the am3 control circuit.

Moreover, there can be also a method of controlling the am1 (=am6) alone by the am1 control circuit while keeping am2 (=am5) and am3 (=am4) fixed, that of controlling the am2 (=am5) alone by the am2 control circuit while keeping the am1 (=am6) and the am3 (=am4) fixed and that of controlling the am3 (=am4) alone by the am3 control circuit while keeping the am1 (=am6) and the am2 (=am5) fixed.

Furthermore, there can be also a method of controlling the am1 (=am6) by the am1 control circuit and the am2 (=am5) by the am2 control circuit while keeping the am3 (=am4) fixed, that of controlling the am1 (=am6) by the am1 control circuit and the am3 (=am4) by the am3 control circuit while keeping the am2 (=am5) fixed and that of controlling the am2 (=am5) by the am2 control circuit and the am3 (=am4) by the am3 control circuit while keeping the am1 (=am6) fixed.

As to the 2–7 code, it is possible to enhance the synchronizing signal detection accuracy by employing 32-bit synchronizing signals having included therein two bit series which never appear in data and which are inverted from each other to make the synchronous signal DC-free.

Synchronizing signals for the 2–7 code shown in FIG. 11 are

"0010 0000 0010 0100 0010 0000 0010 0100".

In order to record according to the NZRI rule:

When started at L: LLHH HHHH HHLL LHHH HHLL LLLL LLHH HLLL

When started at H: HHLL LLLL LLHH HLLL LLHH HHHH HHLL LHHH

In the above signal, an 8T–3T pattern is employed for the synchronizing signal since the 2–7 code does not include in data a 3T pattern "1001" just after an 8T pattern "100000001". Moreover, a synchronizing signal comprises two 8T–3T patterns therein which are inverted from each other to have the same number of "L"s and "H"s so as to be a DC-free code for improving the detecting accuracy.

Recording the 8T–3T pattern in this way, however, in some record-playback systems, the 3T pattern is largely influenced by the 8T pattern, so that there is likelihood that the trailing edge of the 8T is shifted to the side (backward) of the 3T by one bit. Otherwise, in some patterns, the leading edge of the 8T is sometimes shifted forward by one bit. Therefore, the synchronous detecting circuit outputs the pattern as a detection synchronizing signal even if the leading edge thereof is shifted by one bit forward or the trailing edge thereof is shifted by one bit backward, thereby increasing the synchronizing signal detection ratio and reducing the bit error rate.

If the data bits cannot be divided into units shown in the conversion table at the junction between the data and the synchronizing signal and go over the synchronizing signal at a halfway bit thereof, the conversion is performed supposing the presence of data bits "010" at the position of the synchronizing signal to produce channel bits and thereafter the synchronizing signal is replaced with the synchronous data. Therefore, it is possible to enable normal coding and decoding even at junctions.

FIG. 9 shows junctions. Inside () are synchronizing signal portions.

For example, when data bits are followed by a synchronizing signal such as "00110→(synchronizing signal)", four leading data bits "0011" can be converted into 8 channel bits "00100100", but the fifth data bit "0" alone cannot be converted so that the junction between the data bits and a synchronizing signal independent therefrom cannot be determined. Therefore, 6th to 8th data bits are supposed to be "010" so as to replace the "0" with "0010", which is converted into 9th to 16th channel bits "00001000". Thereafter, the 9th and 10th channel bits "00" alone are practically used, followed by a synchronizing signal "0010 0000 0010 0100 . . . " As a result, "001000" and data same as the channel bits are arranged in the synchronizing signal portion which corresponds to 11th to 16th channel bits.

Another example will be described. For example, when data bits are followed by a synchronizing signal such as "001101 → (synchronizing signal)", four leading data bits "0011" can be converted into 8-channel bits "00100100", but the fifth and sixth bit "01" alone cannot be converted so that the junction between the data bits and a synchronizing signal independent therefrom cannot be determined. Therefore, 7th to 9th data bits are supposed to be "010" so as to replace the "01" with "01010". At that time, what is needed for conversion is 5th to 7th bits "010", which is converted into 9th to 14th channel bits "001000". Thereafter, 9th to 12th channel bits "0010" alone are practically used, followed by the synchronizing signal "0010 0000 0010 0100 . . . ". As a result, "00", i.e., data same as the channel bits are arranged in the synchronizing signal portion which corresponds to 13th to 14th channel bits.

As described above, according to the present invention, integrally operating the automatic adaptive equalization and Viterbi decoding in combination enables the reduction of bit error codes to realize optimal data detection. Particularly for binary detection output, a ternary Viterbi decoding circuit outputs, for example, +1, 0, −1, while a binary Viterbi decoding circuit outputs, for example, +1, −1. Since the reliability of these data is enhanced, conversion errors due to miscalculation are reduced to enable stable and optimal equalization.

Moreover, processing the synchronizing signals as set forth above enables stable recording and playback. Furthermore, allowing one-bit deviation of patterns from matching reduces the oversight or error of detection.

What is claimed is:

1. A playback data detecting apparatus comprising:
    a transversal filter for performing partial response equalization;
    a Viterbi decoding circuit for subjecting a filtered output of said transversal filter to Viterbi decoding;
    a first delay circuit for delaying an output delivered through said transversal filter to produce delayed data;
    a selected code determination circuit for determining a selected code output on the basis of one of the delayed data of the output of said transversal filter and an output of said Viterbi decoding circuit;
    a second delay circuit for delaying said filtered output of said transversal filter to produce delayed filtered data;
    a reducing code determination circuit for determining a reducing code output by calculating the difference between the delayed filtered data of the filtered output of said transversal filter and the output of said Viterbi decoding circuit;
    a clocked delaying circuit for delaying said selected code output and said reducing code output, respectively; and
    a multiplying coefficient calculating circuit which calculates an optimal multiplying coefficient of said transversal filter for minimizing bit errors from an output of said clocked delaying circuit and outputs a calculated result to said transversal filter.

2. A playback data detecting apparatus according to claim 1, wherein a recording code adapted thereto has a minimum non-inverted interval of two or three bits; and
    said Viterbi decoding circuit performs ternary/4-state Viterbi decoding or binary/4-state Viterbi decoding for recording codes having a minimum non-inverted interval of two bits and performs ternary/6-state Viterbi decoding or binary/6-state Viterbi decoding for recording codes having a minimum non-inverted interval of three bits.

3. A playback data detecting apparatus according to claim 1, wherein said Viterbi decoding circuit performs ternary Viterbi decoding or decoding of each individual bit, and said multiplying coefficient calculating circuit performs a coefficient control when either "+1" or "−1" of ternary levels "+1", "0" and "−1" is detected, but does not perform said coefficient control when "0" is detected.

4. A playback data detecting apparatus according to claim 3, wherein a 32-bit synchronizing signal is employed for a 2-7 recording code having a minimum non-inverted interval of three bits, said synchronizing signal comprising therein two bit series inverted from each other so as to be DC-free, said bit series being of a pattern which never appears in playback data, so as to enhance a synchronizing detection accuracy.

5. A playback data detecting apparatus according to claim 4, wherein a synchronizing signal employs a pattern comprising therein two 8T-3T bit series to enable detection of said synchronizing signal even if a leading edge of the 8T is shifted forward by one bit or a trailing edge of the 8T is shifted backward by one bit.

6. A playback data detecting apparatus according to claim 4, wherein when data bits cannot be divided into units according to a predetermined conversion table at a junction between the playback data and a synchronizing signal such that the playback data becomes said synchronizing signal at a halfway bit, code conversion is performed by supposing a presence of data bits "010" at a position of the synchronizing signal to produce channel bits, whereupon the synchronizing is thereafter replaced with synchronous data so as to enable normal coding and decoding even at junctions.

* * * * *

UNITED STATES PATENT AND TRADEMARK OFFICE
CERTIFICATE OF CORRECTION

PATENT NO. : 5,938,789
DATED : August 17, 1999
INVENTOR(S) : ITOI

It is certified that error appears in the above-identified patent and that said Letters Patent is hereby corrected as shown below:

ON THE TITLE PAGE:

Item [30], replace priority document number "8-310857" with -- 7-310857 --.

Signed and Sealed this

Twenty-eighth Day of December, 1999

Attest:

Q. TODD DICKINSON

Attesting Officer

Acting Commissioner of Patents and Trademarks